United States Patent
Massie et al.

(10) Patent No.: US 6,697,903 B2
(45) Date of Patent: Feb. 24, 2004

(54) COMMUNICATION INTERFACE SYSTEM, METHOD AND APPARATUS

(75) Inventors: Michael Ross Massie, Bristol, TN (US); Alan D. McNutt, Johnson City, TN (US)

(73) Assignee: Siemens Energy & Automation, Alpharetta, CA (US)

( * ) Notice: Subject to any disclaimer, the term of this patent is extended or adjusted under 35 U.S.C. 154(b) by 435 days.

(21) Appl. No.: 09/814,221

(22) Filed: Mar. 21, 2001

(65) Prior Publication Data

US 2002/0032826 A1 Mar. 14, 2002

Related U.S. Application Data

(60) Provisional application No. 60/190,815, filed on Mar. 21, 2000.

(51) Int. Cl.$^7$ .............................................. G06F 13/00
(52) U.S. Cl. ...................................................... 710/305
(58) Field of Search ..................... 710/100, 2, 62–64, 710/300, 305

(56) References Cited

U.S. PATENT DOCUMENTS

| | | | | |
|---|---|---|---|---|
| 5,165,022 A | * | 11/1992 | Erhard et al. | 710/63 |
| 5,634,015 A | * | 5/1997 | Chang et al. | 710/310 |
| 6,263,385 B1 | * | 7/2001 | Gulick et al. | 710/313 |
| 6,363,446 B1 | * | 3/2002 | Larson | 710/113 |
| 6,370,603 B1 | * | 4/2002 | Silverman et al. | 710/72 |
| 6,439,464 B1 | * | 8/2002 | Fruhauf et al. | 235/492 |
| 6,523,081 B1 | * | 2/2003 | Karlsson et al. | 710/305 |
| 6,581,122 B1 | * | 6/2003 | Sarat | 710/301 |
| 2002/0019891 A1 | * | 2/2002 | Morrow et al. | 710/8 |

* cited by examiner

Primary Examiner—Xuan Thai

(57) ABSTRACT

A communication interface responds to a communication protocol for interfacing a controller and any of a plurality of discrete I/O devices. Each discrete I/O device has a different configuration. The interface has a plurality of modes of operation to accommodate the discrete I/O devices. In a first mode of operation, the interface accommodates a first discrete I/O device wherein a plurality of input pins input signals from a particular discrete I/O and a plurality of output pins output signals to the particular discrete I/O device. In a second mode of operation, the interface accommodates a second discrete I/O device wherein the input pins form a bidirectional input/output port and the output pins form a control and address line for controlling the second discrete I/O device and other discrete I/O devices.

4 Claims, 15 Drawing Sheets

| Signal Name | Description |
|---|---|
| EMD | Expansion Module Data: Bi-directional signal used to communicate address and data to and from the module. |
| EMC0 | Expansion Module Clock 0: Used to access expansion module I/O. Active only during bus transaction. Frequency = 4.125 MHz |
| XA_OD | Address / Output Disable: Active Low, controlled by the Master Function. Dual function signal: XOD - A long pulse, 10 times the clock period or greater will reset the expansion modules. XAS - A short pulse, approximately one clock period, initiates an expansion module bus transaction. |
| EMA[2:0] | Expansion Module Address: Daisy chained from PLC to module to module. Value input to a module becomes that modules address. The module will output its address + 1 to the next module. The module closest to the PLC will have an address of 0. A total of 7 EM can be connected (0:6) |
| +5V | 5 volt power supply – two signal lines |
| GND | Power supply return – two signal lines |

Figure 1

EM Bus Write Transaction Sequence

EM Bus Read Transaction Sequence

Figure 4

| Signal Name | Description | # of Signal |
|---|---|---|
| MA_IN [2:0] | Input, Module Address | 3 |
| MA_OUT [2:0] | Output, Module Address + 1 | 3 |
| XAS | Input: Active Low, initiates bus transaction | 1 |
| XOD | Input: Active Low, EM Reset | 1 |
| EMC0 | Input: Gated Clock, 4.125 MHz Maximum Read => 24 clocks, Write => 25 clocks | 1 |
| EMD | Bi-directional Data Line | 1 |
| ID_BUF [6:0] | Input (Register ID), Identifies EM Type, Decodes ASIC Mode of operation ( Mode 0 or 1) | 7 |
| EXT0 [7:0] | External Port 0<br>Dual Function: Mode 0. Input Data Bus<br>Mode 1. Bi-directional Data Bus | 8 |
| EXT1 [7:0] | External Port 1<br>Dual Function: Mode 0. Output Data Bus<br>Mode 1. Output Address & Control | 8 |
| MSTR_IN | Bus Driver Enable, Active Low | 1 |
| MY_SLAVE_OUT | Bus Driver Enable, Active Low | 1 |
| NEXT_SLAVE_OUT | Bus Driver Enable, Active Low | 1 |
| | | 36 Total I/O Pins |

| EXT 1 | Mode 1 Function | Description |
|---|---|---|
| bit 7 | CS | Chip Select, Active Low, OR'd condition of WRSTRB & RDSTRB |
| bit 6 | Busy | Active Low, indicates activity on the EXT0 & EXT1 |
| bit 5 | WRSTRB | Write Strobe: Active Low, external decode circuitry |
| bit 4 | RDSTRB | Read Strobe: Active Low, external decode circuitry |
| bit 3 | RA3 | Register Address Bit 3, Active High |
| bit 2 | RA2 | Register Address Bit 2, Active High |
| bit 1 | RA1 | Register Address Bit 1, Active High |
| bit 0 | RA0 | Register Address Bit 0, Active High |

Figure 7

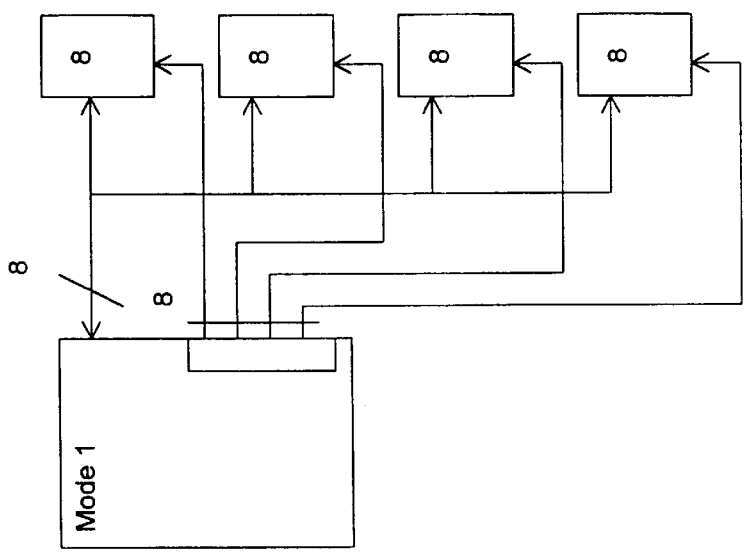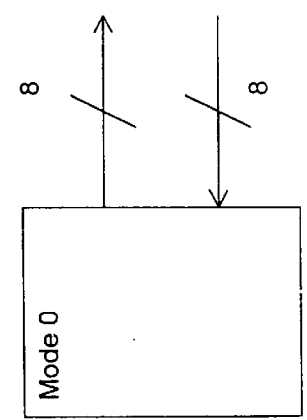
Figure 15a
Figure 15b

COMMUNICATION INTERFACE SYSTEM, METHOD AND APPARATUS

This application claims the benifit of prov. appliaction 60/190,815 filed on Mar. 21, 2000.

BACKGROUND

1. Field of the Invention

The invention relates to a communication interface system, method and apparatus and, more particularly, to a universal integrated module for interfacing a control module to other modules.

2. Related Information

In the past, interfaces have been introduced that interface a control module to other modules. However, there has been no universal interface for interfacing a plurality of communications protocol as particularly contemplated by the present invention.

BRIEF DESCRIPTION OF THE DRAWINGS

FIG. 1 is a table;

FIG. 4 is a timing diagram;

FIG. 7 is a timing diagram;

FIGS. 15a and 15b are block diagrams.

DETAILED DESCRIPTION OF THE PREFERRED EMBODIMENT

The interface of the present invention provides serial communication to expansion modules (EM). A CPU of the interface controls all communications to and from the EM's and will be referred to as the "Master Function". The Expansion Module will include an ASIC to achieve this serial communication protocol and will be referred to as the "Slave Function" or "Slave ASIC".

The I/O Expansion bus signals as viewed by the Expansion Module are described in the following table. The connection from the PLC to the EM and from EM to EM will be 1 to 1 using a 10 pin header type connection. Refer to FIG. 1 for Expansion I/O Bus connector pin assignments.

Figure 2A:
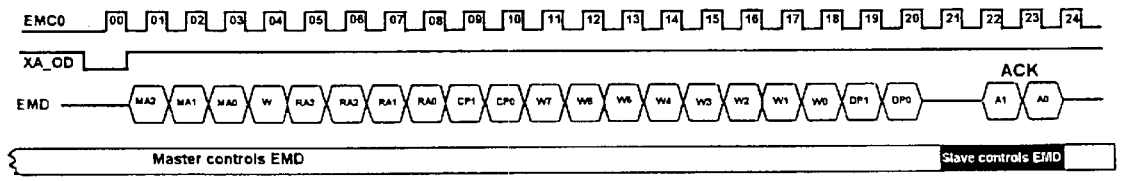
FIGS. 2a and b are timing diagrams.
Figure 2B:
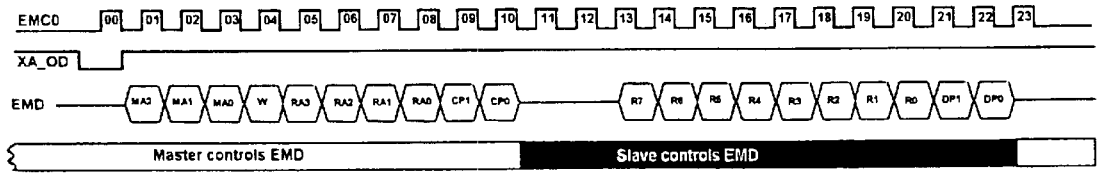

The following diagrams in FIGS. 2a–2b illustrate an Expansion Bus Read cycle and Write cycle sequences. A bus transaction will be initiated by short active low pulse on XA_OD signal. In FIG. 2a:

| | |
|---|---|
| MA[2:0] | Module Address that CPU is addressing |
| W | Transaction Type requested by CPU, Read/Write Bit (1=>Write, 0=>Read) |
| RA[3:0] | Register Address that CPU is addressing |
| CP[1:0] | Control Register Parity Bits generated by CPU |
| W[7:0] | Data written to Expansion Module by CPU |
| DP[1:0] | Data parity generated by CPU |
| Ack[1:0] | Acknowledge bits returned to CPU by the Slave A1: 0 indicates a successful write cycle (no parity errors); 1 indicates an invalid write transaction, data parity error encountered A0: defaults to a 1 |

In FIG. 2b:

| | |
|---|---|
| MA[2:0] | Module Address that CPU is addressing |
| W | Transaction Type requested by CPU, Read/Write Bit (1=>Write, 0=>Read) |
| RA[3:0] | Register Address that CPU is addressing |
| CP[1:0] | Control Parity Bits generated by CPU |
| R[7:0] | Data written to CPU from Expansion Module |
| DP[1:0] | Data parity generated by Expansion Module |

Figure 3:
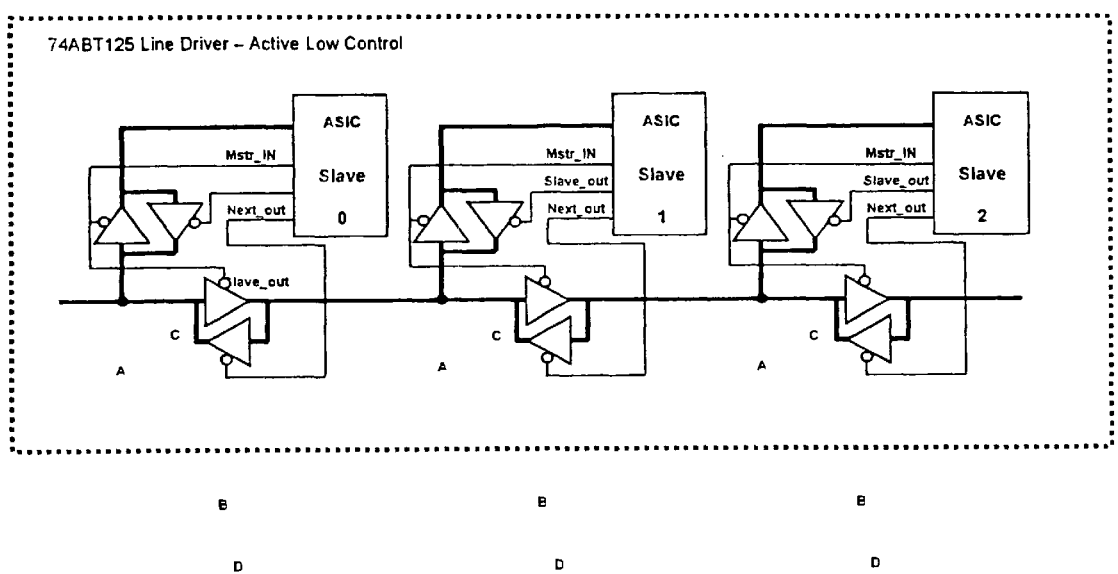
FIG. 3 is a table.

Each EM implements an electrical interface to the expansion I/O bus consisting of termination circuits and bus driver circuits. This will allow the addition of +5V power to be introduced anywhere in the daisy chained I/O bus and provides some protection of the SLAVE ASIC I/O. Given that EMD signal is a bidirectional signal, control circuitry will be provided on the bus driver circuits to avoid bus contention errors. Three control signals (MSTR_IN, MY_SLAVE_OUT, and NEXT_SLAVE_OUT) are used to enable/disable the EMD bus driver circuits. For details of the termination circuitry refer to FIG. 3. FIG. 3 describes EMD bus driver circuit configuration for three expansion modules.

A bus driver circuit is provided which has an active low enable line. The Slave ASIC generates 3 control signals to properly enable/disable the bus drivers. Control signal MSTR_IN enables bus driver circuits A and B. This allows the EMD signal to be input into the expansion module ASIC and to be input into the next expansion module ASIC down stream. MSTR_IN becomes active when XAS is detected and becomes inactive prior to any response from an EM. The signals MY_SLAVE_OUT and NEXT_SLAVE_OUT control EMD responses from the EM's according to the EM's physical address position. For example, MY_SLAVE_OUT controls the EMD signal as an output of the EM that was addressed by the CPU. The signal NEXT_SLAVE_OUT passes the EMD response through the EM if the EM addressed by the CPU has a higher address or is downstream from that EM. Neither MY_SLAVE_OUT or NEXT_SLAVE_OUT are asserted when the CPU addresses an EM with a lesser address. All three control signals immediately become inactive on the occurrence of XOD.

In one particular embodiment of the invention, the initial Slave design may be developed in a 128 Macrocell CPLD using VHDL as a design instrument. The CPLD design is migrated into an ASIC design. The ASIC is designed to have 44 total pins with 36 usable pins for I/O and 8 pins for power and ground. The operating frequency of the SLAVE ASIC may be 4.125 MHz maximum, which is well within the ASIC capability. The following table defines the required inputs and outputs of the Slave ASIC. Refer to FIG. 4 (SLAVE ASIC Suppliers Specification) for details of the ASIC.

The I/O described above accommodates all Expansion Module I/O configurations. That is, the invention is a universal interface. This is accomplished by implementing two modes of operation within the ASIC. The differences in ASIC operation is the implementation of EXT0 and EXT1 data ports.

The slave ASIC has two modes of operation to accommodate all Expansion Module I/O configurations. In Mode 0, the EXT0 bus is an 8 bit input register and EXT1 bus will be an 8 bit, active low, output register. EXT0 data bus and EXT1 data bus interfaces directly to the Expansion Module digital I/O. Mode 0 is used for Expansion Modules of 8IN/8OUT or less. In Mode 1, EXT0 bus is used as an 8 bit, active high, bidirectional data bus and EXT1 bus is used as 8 bits of address and control. External registers and decode circuitry are required for Mode 1 operation. Mode 1 is used when the Expansion Module I/O configuration is greater than 8IN/8OUT or for an intelligent module. The ID_REG is decoded by each EM at power up to determine its mode of operation. The ID_REG is also be read by the CPU to determine the Expansion Module type.

The polarity of EXT0 data port is "active high" for both Mode 0 and 1. EXT1 data port is "active low" while in mode 0 operation and in mode 1 the control lines is "active low" and the address lines is "active high."

In operation, the Slave ASIC implements a state machine architecture to provide proper communication and control. At initial power up the CPU issues an active XOD signal. Detection of XOD places the state machine into its home state and the EXT1 data port is cleared if in mode 0 or the external output registers is cleared if in mode 1. Also at initial power up, the Slave ASIC determines its Module Address (MA_IN), Mode of operation (Mode 0 or 1) and propagates the next Module Address (MA_OUT) by incrementing its Module Address by 1. Once XOD is released, the Slave ASIC state machine continuously monitors the XAS signal from its home state. A bus transaction is initiated when XAS becomes active and transitions to state 0 on the first rising edge of EMC0 clock. At state 0 the state machine is placed into a known state and propagates to state 1 on the next rising edge of EMC0 clock. If at any time the XOD signal becomes active, then the EXT1 data port is asynchronously reset and the state machine returns to its home state. If in mode 1 operation, the external output registers is asynchronously cleared and the state machine returns to its home state. The next occurrence of XAS synchronously places the state machine into a known state.

Figure 5:
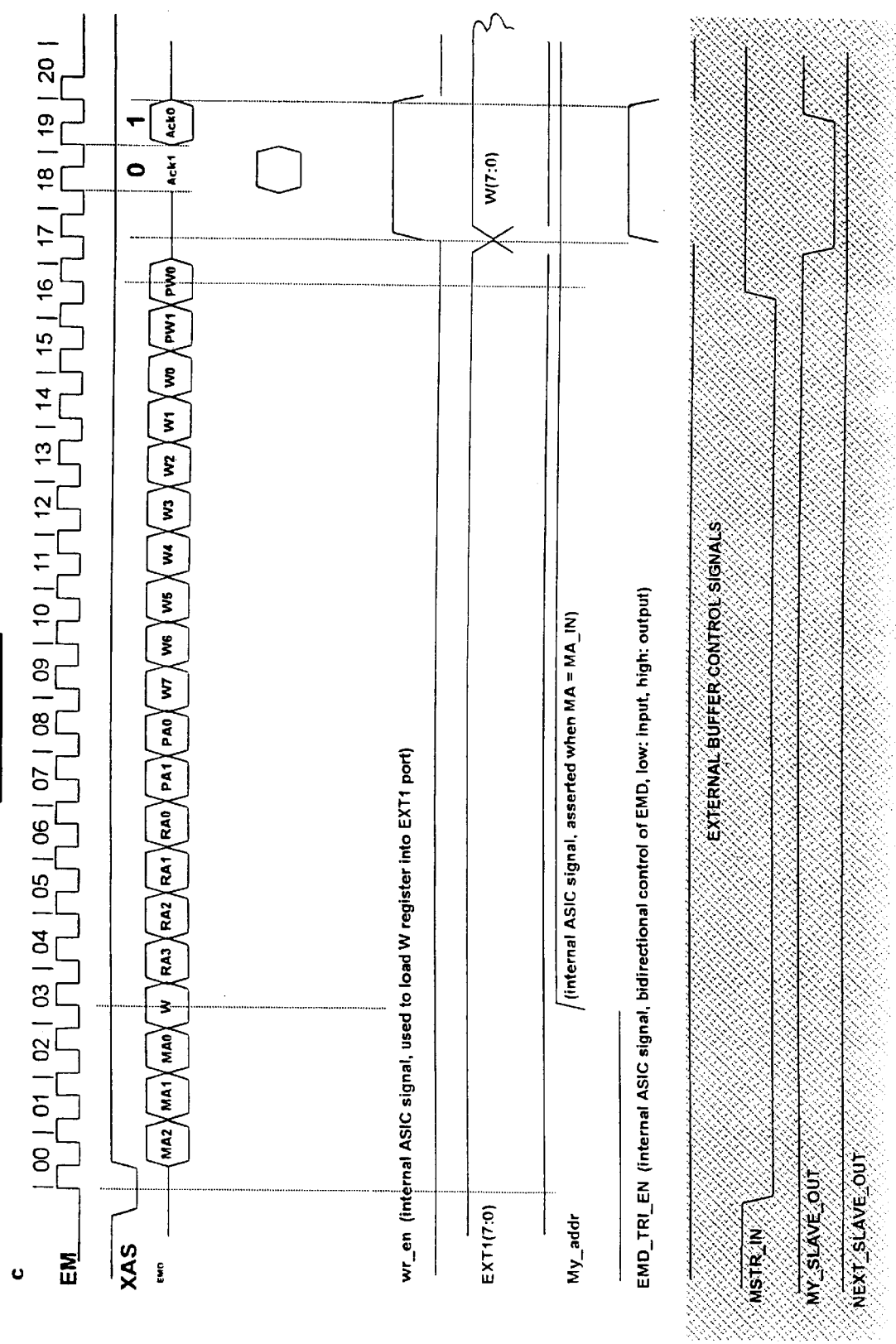
FIG. 5 is a timing diagram.

FIG. 5 illustrates a Mode 0 Write Transaction. As shown in FIG. 5, once a valid XAS is detected the Slave ASIC propagates to state 0 of the control state machine on the first rising edge of EMC0 clock. At state 0, the MSTR_IN signal is asserted and the EMD signal is enabled as an input to the Slave ASIC. The control state machine begins to shift in the control register data beginning on the rising edge of EMC0 clock 1 (state 1) and ending on the rising edge of EMC0 clock 10 (state 10). At state 4 (EMC0 clock 4) the Slave ASIC determines if the Module Address (MA) shifted in from the CPU equals the Module Address (MA_IN) propagated in at power up and if true "My_addr" is asserted. In the case that the addresses do not match, My_addr is not asserted, and the state machine continues through the remaining states to account for proper EMD bus driver control and control register parity checks. At State 10 the Slave ASIC determine the type of transaction to occur and enters either the write state machine or read state machine on the next EMC0 clock. During a write transaction the Slave ASIC shifts in Write data beginning at state 11 (EMC0 clock 11) and ending at state 20 (EMC0 20). Also, during state 1 the control register parity is checked and in the event an error is detected on the control register the write state machine returns to an idle state and the control state machine returns to its home state on the next EMC0 clock. EXT1 data port is not disturbed and the MSTR_IN bus control signal becomes inactive. If no control register parity error is detected then the write data is shifted in accordingly. At state 20 the MSTR_IN bus control signal is released and at state 21 the state machine preparesthe EMD bus control signals for a response back to the CPU. If "My_addr" is valid then MY_SLAVE_OUT bus control signal is asserted. If "My_addr" is not valid then the NEXT_SLAVE_OUT bus control signal is asserted only if the CPU has addressed a module of a greater address. At state 22 the Slave ASIC checks parity on the write data. When a write data parity error is detectedhe Slave ASIC returnsan invalid (11) Acknowledge to the CPU and does not present new data to EXT1 data port. If no parity error is detected, then the Slave ASIC returns a valid (01) Acknowledge to the CPU, decodes the register address (RA) and enables new data onto the EXT1 data port if register address 'C' (hex) has been decoded. If any other register is decoded the state machine will returns a valid Acknowledge to the CPU, but does not present new data to the EXT1 data port. This is only true while in mode 0 operation. On the rising edge of EMC0 clock 24 the write state machine returns to an idle state and the control state machine returns to its home state.

Figure 6:
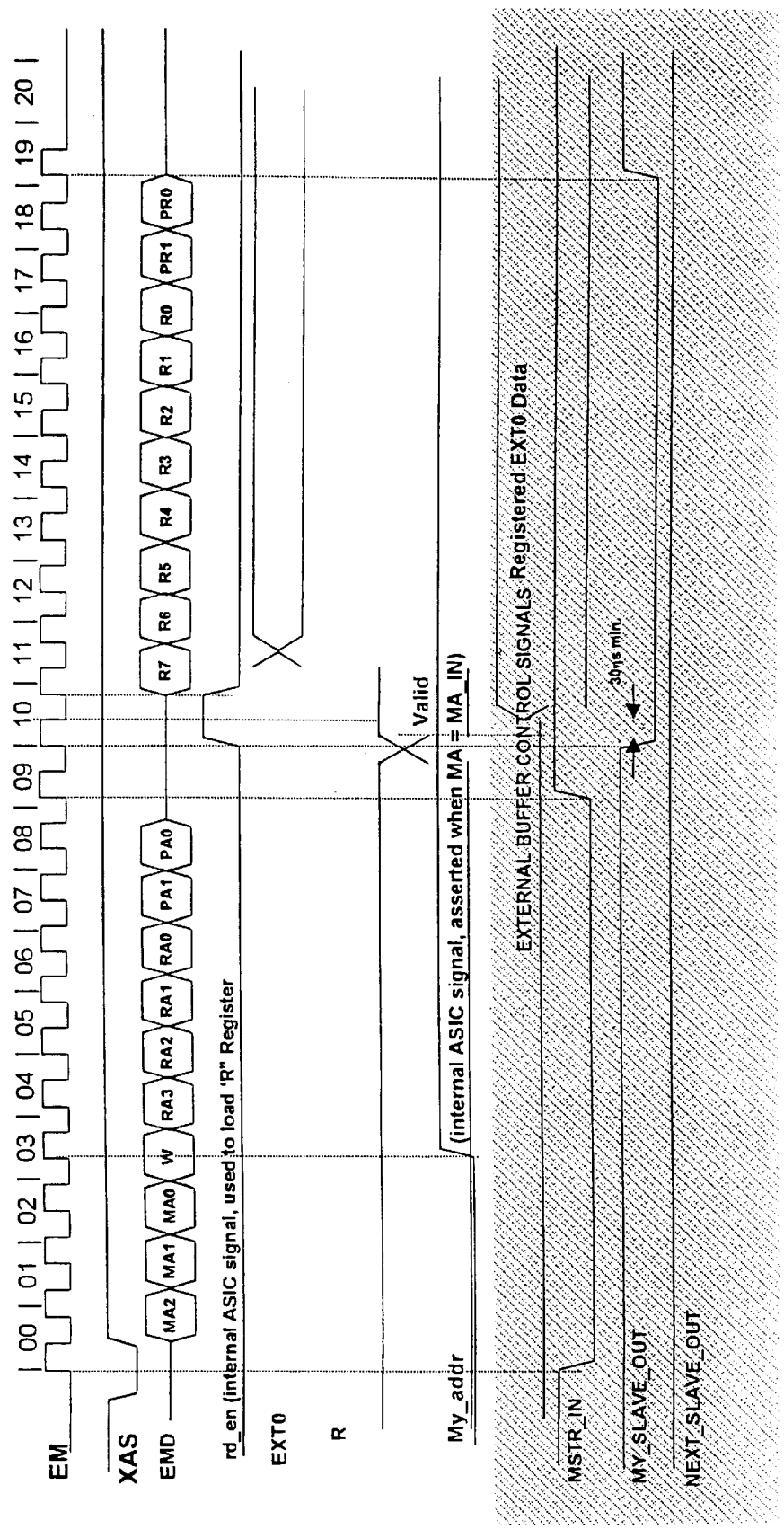
FIG. 6 is a table.

FIG. 6 illustrates a mode 0 read transaction with the CPU addressing RA 8(hex). The control state machine operates the same as the previous write bus transaction, except at state 10 it now enters the read state machine. At state 11 the read machine releases the EMD bus control signal MSTR_IN, select the EMD (EMD_TRI_EN) bi-directional port as an output, and checks the control register parity. If a parity error occurs the read state machine returns to an idle state and the control state machine returns to a home state on the next rising edge of EMC0 clock. If no error was detected then the read state machine propagates to state 12 on the next rising edge of EMC0 clock. At state 12 the state machine prepares the EMD bus control signals for a response back to the CPU by asserting bus control signal MY_SLAVE_OUT. Also at state 12 the register address (RA) is decoded to determine the data source. If RA decodes to 0 then the ID_BUF data is enabled, if RA decodes to 8 then EXT0 data bus is enabled, and if any other address is decoded then the hex value FF is enabled. On the falling edge of EMC0 12 the "R" register is loaded with the appropriate data either from the EXT0 data bus, the ID_BUF, or the default value of FF. For the case in FIG. 2 the EXT0 data is loaded into the "R" register. On the next rising edge of EMC0 clock (state 13) the read state machine shifts the read data bit 7 onto the EMD line and the last read bit 0 is shifted in on the rising edge of EMC0 clock 20 (state 20). The Slave ASIC generates 2 parity bits, PR1 and PR0, on the 8 bits of read data and shift this data onto the EMD line at states 21 and 22. At state 23 all EMD bus control signals are released, the read machine returns to an idle state and the control machine returns to its home state.

Mode 1 Operation will now be discussed with reference to FIG. 7. The EXT1 bus will be used as a control port in ASIC Mode 1. The table in FIG. 7 describes each bit for EXT1 data port when in ASIC Mode 1.

Figure 8:
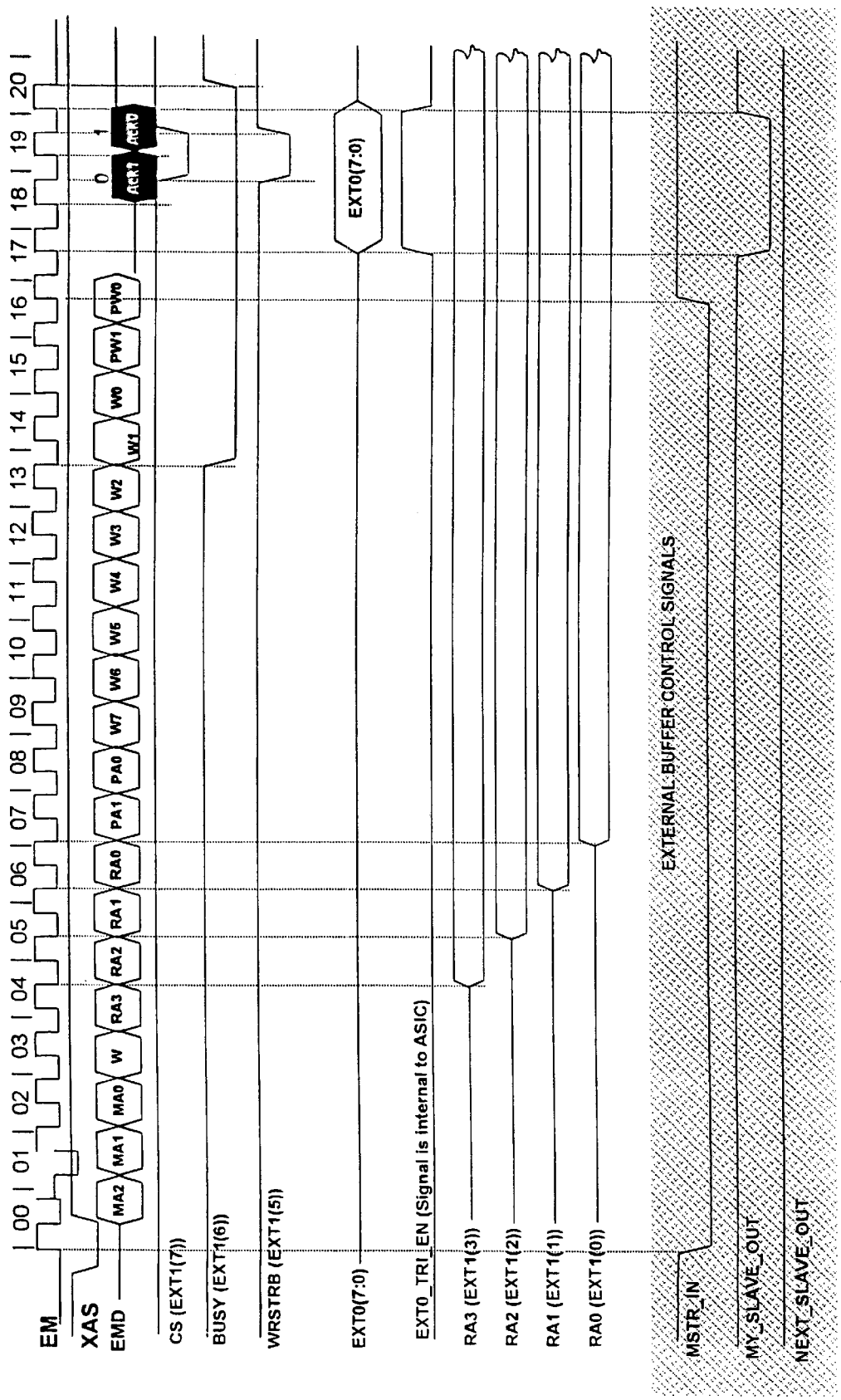
FIG. 8 is a timing diagram.
Figure 9:
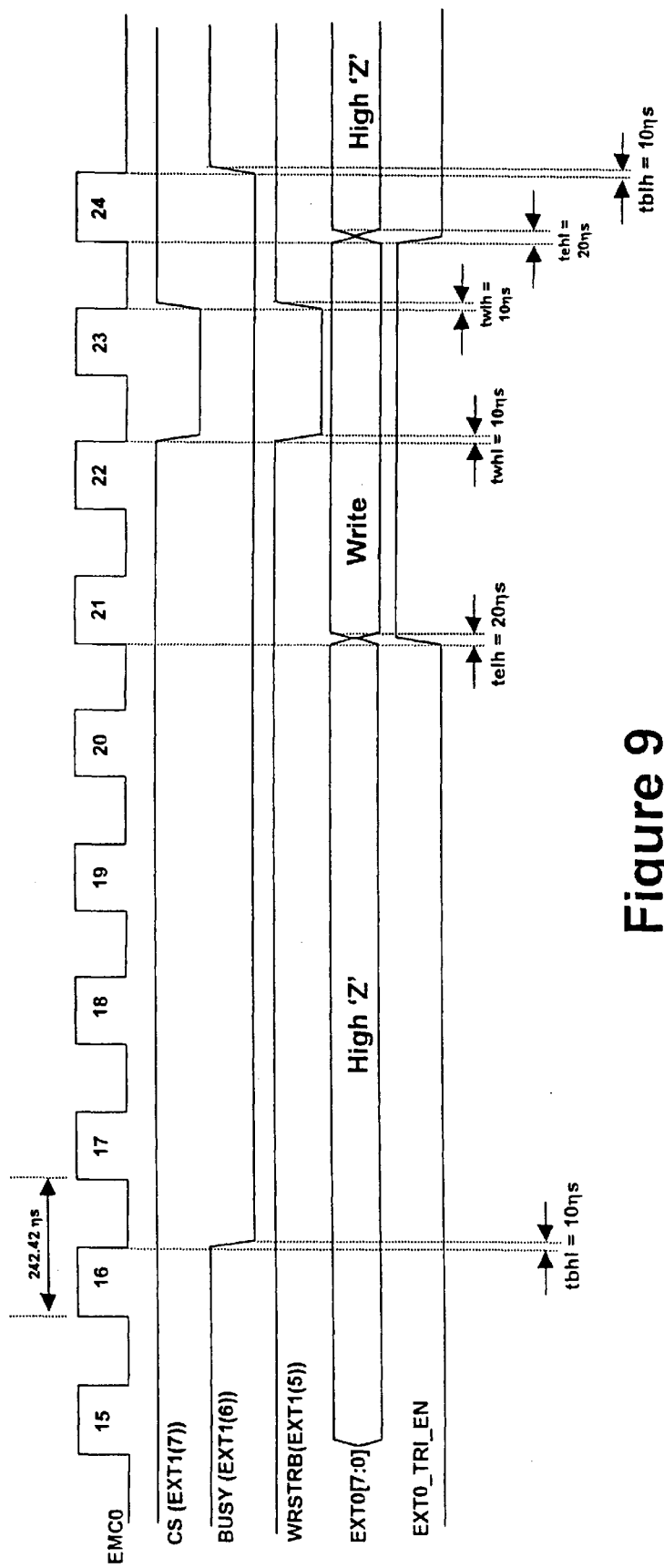
FIG. 9 is a timing diagram.

In a Mode 1 Write Transaction, the control register state machine and the write state machine function the same as in mode 0, however the external port usage and the available registers differs from mode 0. In mode 1, EXT1 data port is used as a control port for external decode circuitry and EXT0 data port is a bi-directional data port. Write data is enabled onto EXT0 data port on the rising edge of EMC0 clock 21 and is valid for 3 clock periods. The Register Address (RA[3:0]) is clock'd onto EXT1 data port on the falling edge of EMC0 clocks 5, 6, 7, & 8 respectively. All 16 register addresses is available for external decode. The WRSTRB is asserted on the falling edge of ECM0 clock 22 and is cleared on the falling edge of EMC0 clock 23. The signal Busy is asserted on the falling edge of EMC0 clock 16 and is cleared on the falling edge of EMC0 clock 24. If a parity error is detected on the WRITE byte, then both the ASIC registers and the external registers retain their last received value. Refer to the FIGS. 8 and 9 for detailed timing information for a time exploded view of Mode 1, Write Transaction Timing.

Figure 10:
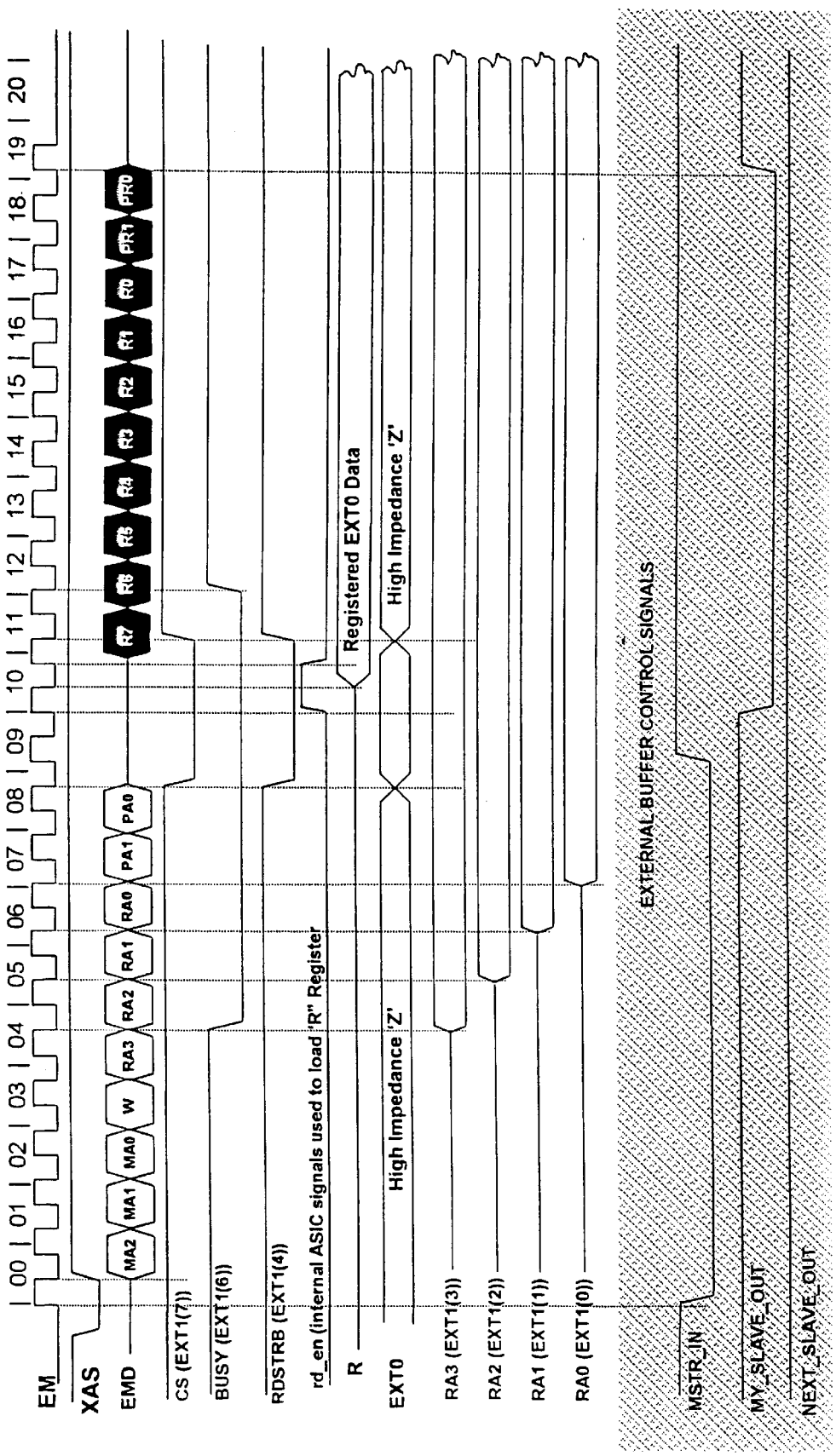
FIG. 10 is a timing diagram.
Figure 11:
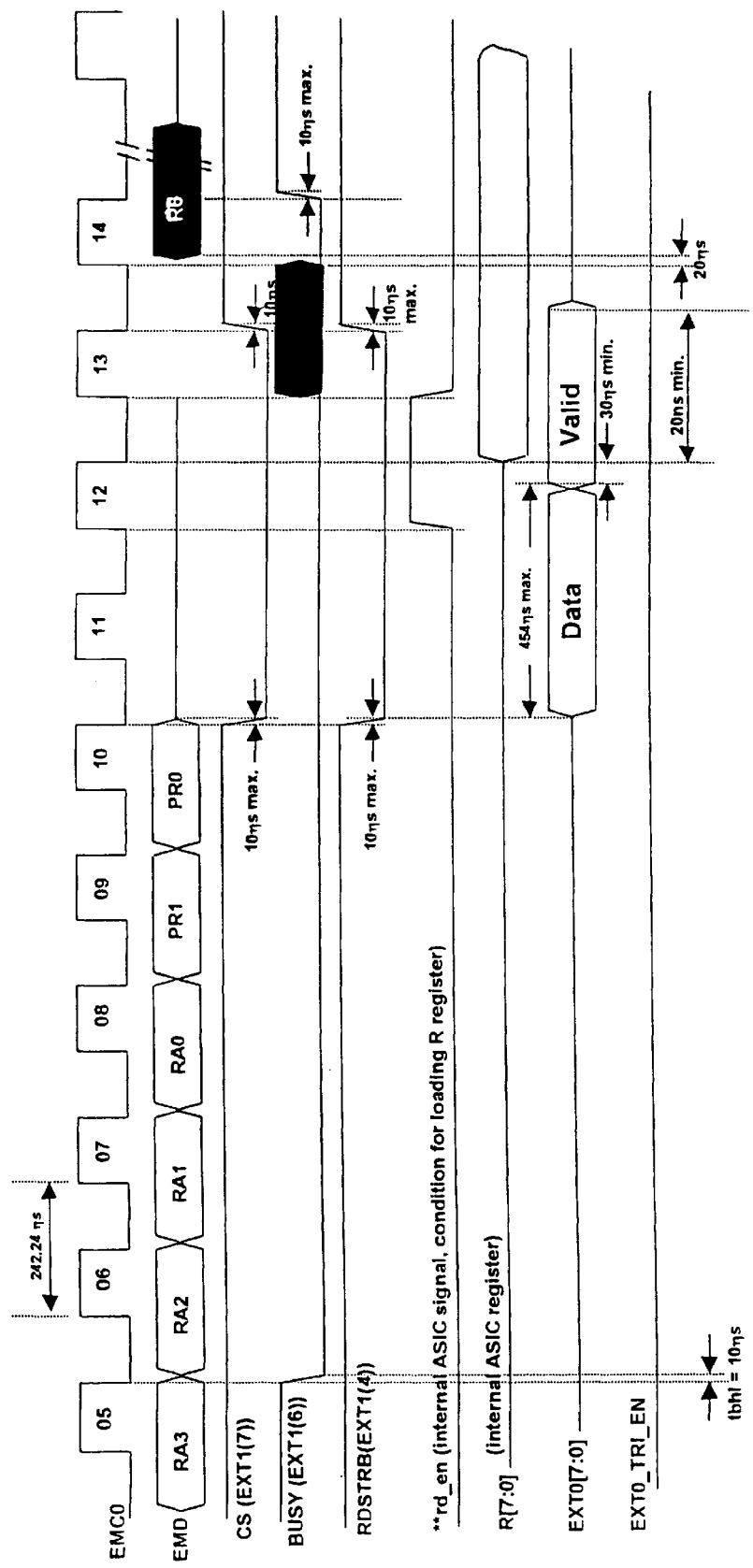
FIG. 11 is a timing diagram.

In a Mode 1 Read Transaction, the control register state machine and the read state machine function the same as in mode 0, however external port usage and the available registers differ from mode 0. In mode 1, EXT1 data port is used as a control port for external decode circuitry and EXT0 data port is a bidirectional data port. Also, the CPU can access all 16 registers in Mode 1 with register 0 still the ID register. Refer to FIGS. 10 and 11 for timing details of the control port EXT1 and the data port EXT0. FIGS. 10 and 11 illustrate Mode 1, Read Transaction Timing.

9.0 ID Register Definition:

The ID Register is addressed from Register Address (RA) 00 hex and is defined in FIG. 11. The Slave ASIC first bit 7 with a 0 and the remaining 7 bits are hardwired according to the Module type. According to the ID Register definition, the Slave ASIC operate in ASIC Mode 0 only for ID Register values of 01, 04, and 05 hex. All other ID Register values operate in Mode 1.

Figure 12:
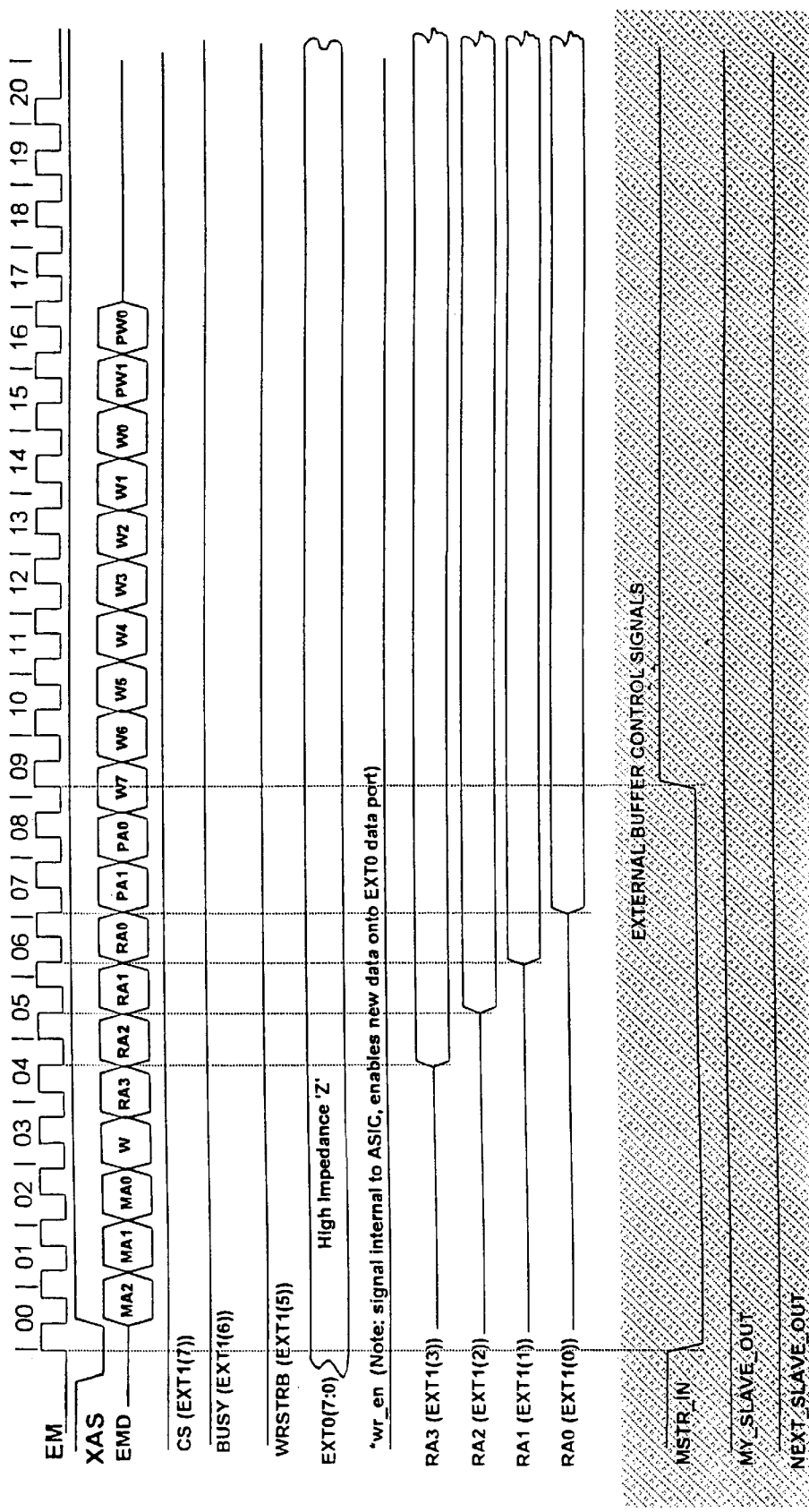
FIG. 12 is a timing diagram.
Figure 13:
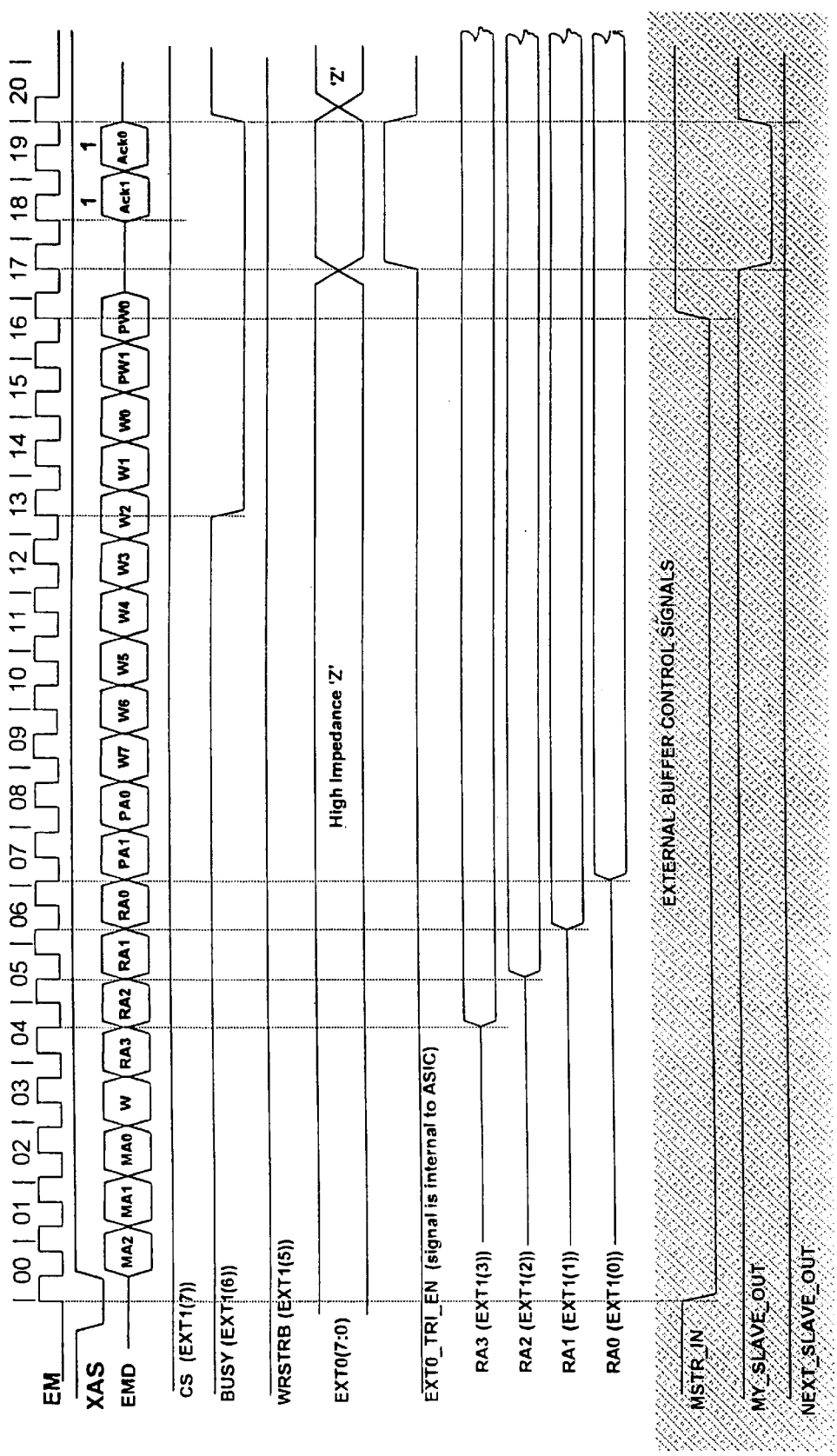
FIG. 13 is a timing diagram.
Figure 14:
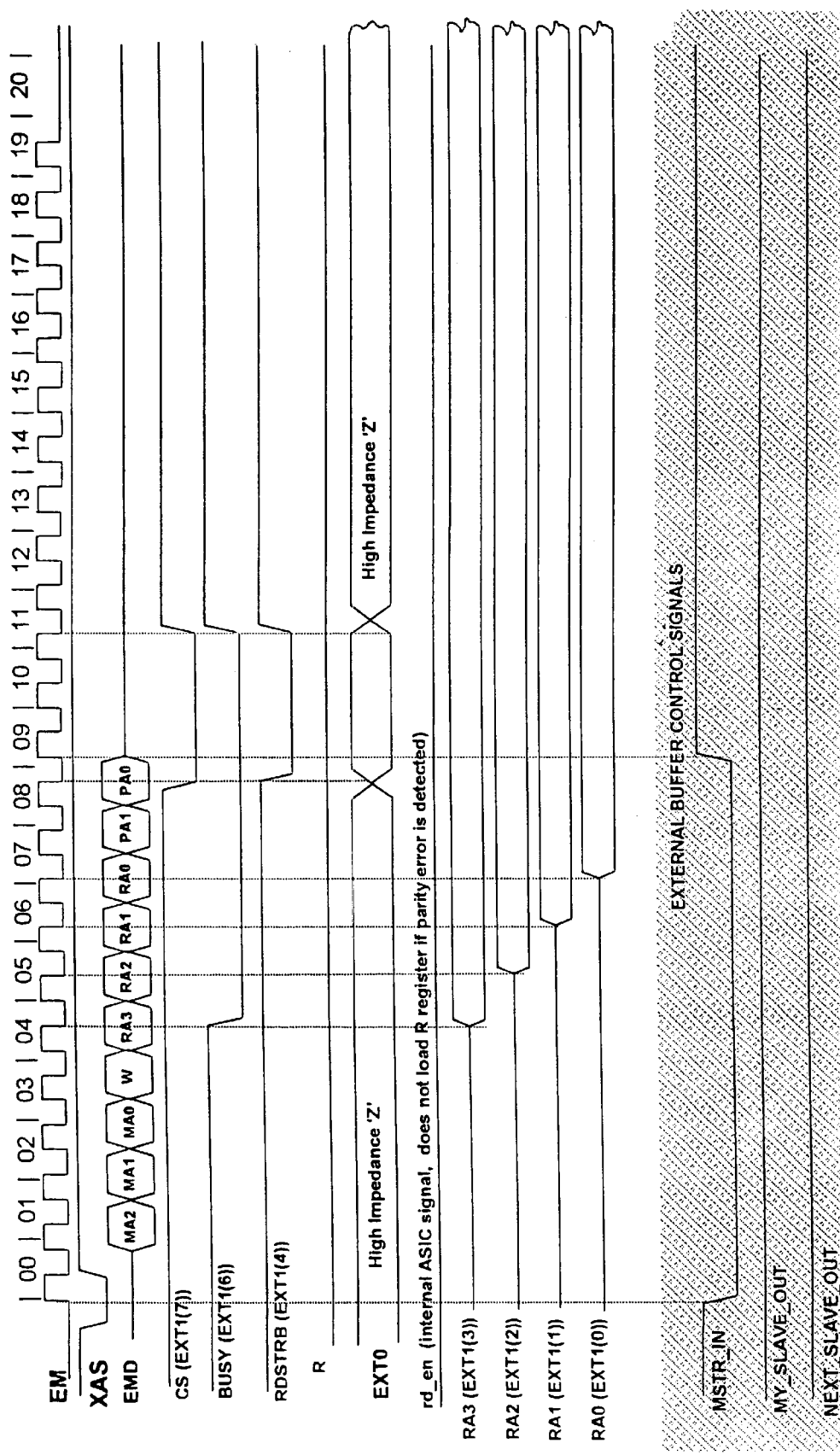
FIG. 14 is a timing diagram.

FIGS. 12–14 contains mode 1 Read and Write Bus transactions that display various parity errors. The figures illustrate the Bus operation/response under these conditions. Mode 0 bus transactions respond to these errors in the same manner. FIG. 12 illustrates Mode 1, Control Register Parity Error during a Write Transaction. FIG. 13 illustrates Mode 1, Write Register Parity Error during a Write Transaction. FIG. 14 illustrates MODE 1, Control Register Parity Error During a READ Transaction.

FIGS. 15a and 15b illustrate the two modes in block diagram form. As shown in FIG. 15a, the slave ASIC is in mode 1. In this state, a first bus line is dedicated as an output and the second bus provides control lines for sending control signals to the attached modules. In FIG. 15b, the same slave ASIC is switched into mode 0. In this state, the first bus remains a bused output. The second bus, however, is switched to a bused input. Thereby, the invention realizes the universal interface for a plurality of modes as contemplated in the description of the modes above.

While the present invention is described with reference to particular embodiments, it will be appreciated that the invention is not so limited to a specific embodiment, but may encompass all modifications and permutations that are within the scope of the invention.

We claim:

1. A communication interface apparatus that responds to a communication protocol for interfacing a controller and any of a plurality of discrete I/O devices, each discrete I/O device having a different configuration, said apparatus having a plurality of modes of operation to accommodate said discrete I/O devices, said apparatus comprising:

a first mode of operation that accommodates a first discrete I/O device wherein a plurality of input pins input signals from a particular discrete I/O and a plurality of output pins output signals to said particular discrete I/O device; and a second mode of operation that accommodates a second discrete I/O device wherein said input pins form a bidirectional input/output port and said output pins form a control and address line for controlling said second discrete I/O device and other discrete I/O devices.

2. The apparatus of claim 1, wherein said input pins are the same input pins for said first mode as for said second mode.

3. The apparatus of claim 1, further comprising data structures for inputting and outputting signals between the communication interface and said discrete I/O modules, wherein a format for a data structures for both of said first and second modes is the same.

4. The apparatus of claim 1, further comprising multiple read and write transactions in said first mode that provide and extended I/O bit protocol.

* * * * *